(12) United States Patent
Jaroch

(10) Patent No.: US 10,481,872 B2
(45) Date of Patent: Nov. 19, 2019

(54) CRYPTOGRAPHICALLY SECURE RANDOM NUMBER GENERATOR

(71) Applicant: Colossio, Inc., Chicago, IL (US)

(72) Inventor: Joseph A. Jaroch, Chicago, IL (US)

(73) Assignee: Colossio, Inc., Chicago, IL (US)

( * ) Notice: Subject to any disclaimer, the term of this patent is extended or adjusted under 35 U.S.C. 154(b) by 0 days.

(21) Appl. No.: 15/689,118

(22) Filed: Aug. 29, 2017

(65) Prior Publication Data

US 2019/0065152 A1    Feb. 28, 2019

(51) Int. Cl.
*G06F 7/58* (2006.01)

(52) U.S. Cl.
CPC .............. *G06F 7/588* (2013.01); *G06F 7/58* (2013.01)

(58) Field of Classification Search
None
See application file for complete search history.

(56) References Cited

U.S. PATENT DOCUMENTS

| | | | | |
|---|---|---|---|---|
| 9,495,190 B2 * | 11/2016 | Ellison | | G06F 7/588 |
| 2002/0172359 A1 * | 11/2002 | Saarinen | | G06F 7/588 |
| | | | | 380/46 |
| 2004/0078576 A1 * | 4/2004 | Geitinger | | G06F 7/582 |
| | | | | 713/181 |
| 2008/0256151 A1 * | 10/2008 | Acar | | G06F 7/58 |
| | | | | 708/250 |
| 2010/0036900 A1 * | 2/2010 | Ross | | G06F 7/58 |
| | | | | 708/254 |
| 2011/0047545 A1 * | 2/2011 | Ellison | | G06F 7/588 |
| | | | | 718/1 |
| 2014/0040338 A1 * | 2/2014 | Van Der Sluis | | G06F 7/588 |
| | | | | 708/254 |
| 2015/0293748 A1 * | 10/2015 | Falk | | G06F 7/582 |
| | | | | 713/193 |
| 2016/0124716 A1 * | 5/2016 | Venkata | | G06F 7/588 |
| | | | | 708/250 |

* cited by examiner

*Primary Examiner* — Michael D. Yaary
(74) *Attorney, Agent, or Firm* — Barnes & Thornburg LLP

(57) ABSTRACT

Various aspects of the subject technology relate to systems, methods, and non-transitory machine-readable medium for generating random numbers are disclosed herein. Entropic data is collected from a computer system and the entropic data is stored as raw data in an assigned entropy pool. The entropic data is encrypted using a globally incrementing counter as an encryption key and the encrypted bytes are returned as a random number.

18 Claims, 11 Drawing Sheets

CRYPTOGRAPHICALLY SECURE RANDOM NUMBER GENERATOR

BACKGROUND

Field

The present disclosure generally relates to a random number generator and more particularly to a cryptographically secure random number generator.

Description of the Related Art

Random number generators are the underpinning algorithms of the modern world and are utilized in website connections, weather modeling, casino operations, and secure communication. However, existing random number generators with mathematic vulnerabilities may result in fundamentally insecure and predictable random numbers, allowing a set of observations for predicting future random numbers.

SUMMARY

According to certain aspects of the present disclosure, a method for generating a random number generator is provided. The method includes receiving a first request for generating a random number. The method also includes collecting entropic data generated from an entropy source of a plurality of entropy sources in the client computing device and storing the collected entropic data in a first pool, where each pool is assigned to a corresponding entropy source and the stored entropic data is a raw data. The method further includes encrypting, using a counter, the entropic data from the first pool with a hash of entropic data from a second pool and providing the encrypted data to the client computing device, where the encrypted data is a random number.

According to certain aspects of the present disclosure, a system for generating a random number is provided. The system includes one or more processors and a memory coupled to the one or more processors, the memory including instructions that, when executed by the one or more processors, cause the one or more processors to receive a first request for generating a random number. The instructions also cause the processor to collect entropic data generated from an entropy source of a plurality of entropy sources in the client computing device and store the collected entropic data in a first pool, where each pool is assigned to a corresponding entropy source and the stored entropic data is a raw data. The instructions further cause the processor to encrypt, using a counter, the entropic data from the first pool with a hash of entropic data from a second pool and provide the encrypted data to the client computing device, where the encrypted data is a random number.

According to certain aspects of the present disclosure, a non-transitory machine readable medium for generating a random number is provided. The machine readable medium includes instructions, which when executed by a machine, cause the machine to perform operations including receiving a first request for generating a random number. The operations also include collecting entropic data generated from an entropy source of a plurality of entropy sources in the client computing device and storing the collected entropic data in a first pool, where each pool is assigned to a corresponding entropy source and the stored entropic data is a raw data. The operations further include encrypting, using a counter, the entropic data from the first pool with a hash of entropic data from a second pool and providing the encrypted data to the client computing device, where the encrypted data is a random number.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

Figure 1:
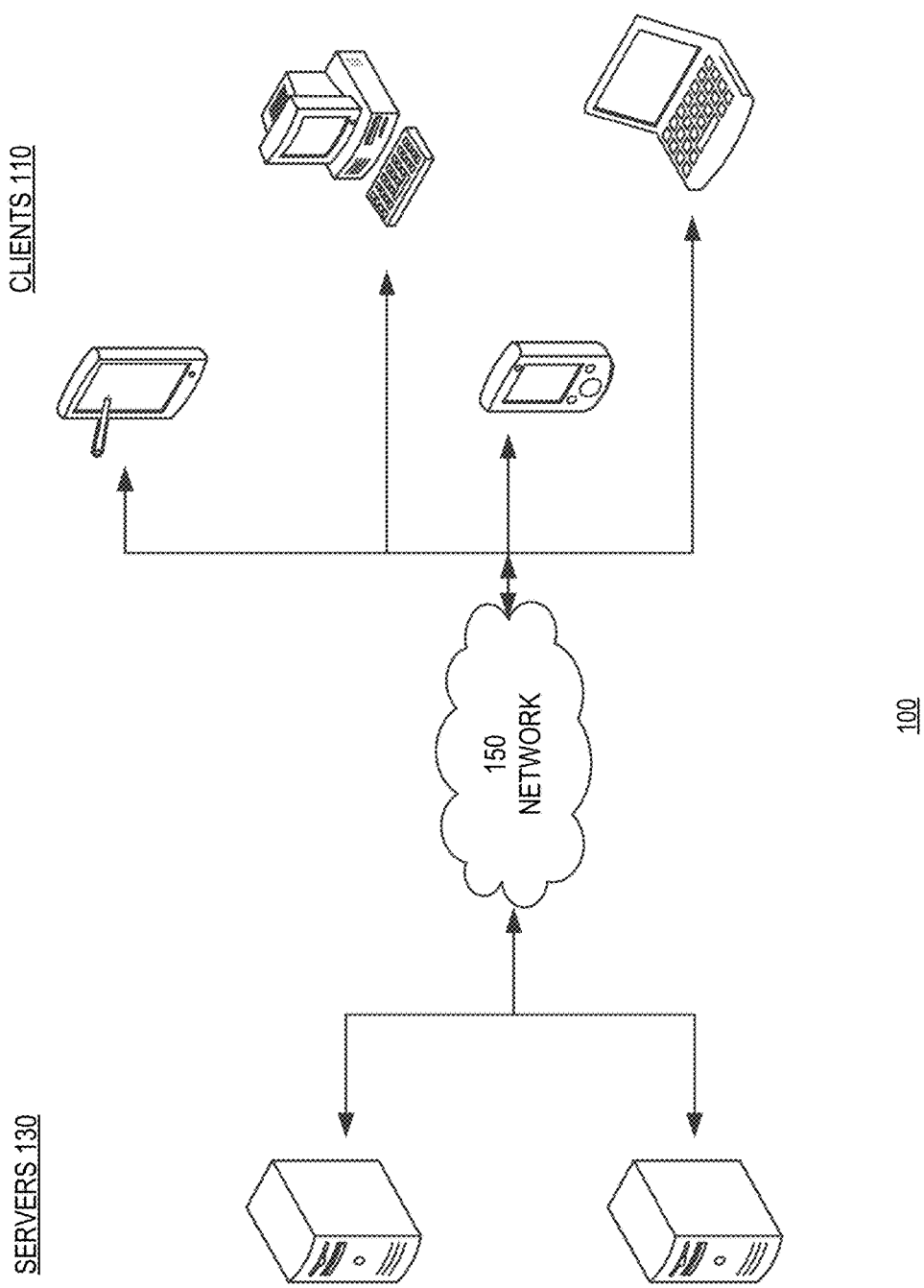
FIG. 1 illustrates an example architecture for generating random numbers according to some implementations of the disclosure.

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

General Overview

Hardware status, active process statistics, or other areas of the system can be collected to uniquely identify a computer system. The system identifies information about the computer system and stores the system information (e.g., entropic data) in an entropy pool. According to one embodiment, the entropic data is used to seed a random number generator to generate random numbers. A globally incrementing counter may be used as a key to a stream cypher which encrypts the entropic data selected from the entropy pool.

In one embodiment, the entropy pool is selected to read the nearest prime number to the square root of the number of requested bytes. This process is repeated for the other pools until at least the number of requested bytes has been read. The original bytes from each pool are encrypted with a hash of all of the bytes which were read from a plurality of pools. The pool counter is moved a prime number of bytes away from its starting position. The encrypted data is provided as a random number.

The disclosed system is designed to be fundamentally resilient to known and anticipated attacks against random number generators, avoiding the flaws in existing generators and providing a feed of random data which is secure and unpredictable. The disclosed system can produce normalized random data to the extent that every subatomic particle in the system can be simulated randomly with no repetition.

The disclosed system addresses the problems of data insecurity and vulnerable computer protection that are specifically arising in the realm of computer technology, by providing a solution rooted in computer technology, namely, by collecting entropic data from the computer environment, storing the entropic data as raw data in an assigned entropy pool, encrypting the entropic data using a globally incrementing counter as an encryption key, and hooking the random number generator functionality to replace existing random number generators.

The disclosed system provides several advantages including gathering, persisting, and creating entropy on a computing device, retaining the full entropic data in a manner that prevents data pollution from malicious actors. The disclosed system further provides additional entropy to enhance security by replacing the existing random number generator code resident in the system.

The disclosed system provides improvements to the existing functioning of the computer hardware itself because it substantially increases a level of security and protects the computer system from malicious and unauthorized third party providers. Specifically, the disclosed system can protect the overall system by preventing pollution of the memory including the entropy pools.

Example System Architecture

FIG. 1 illustrates an example architecture 100 for generating random numbers using a random number generator. The architecture 100 includes servers 130 and clients 110 connected over a network 150. One of the many servers 130 is configured to host a computer-operated network. The servers 130 can be any device having an appropriate processor, memory, and communications capability for hosting the network and the database. The client devices 110 can be, for example, desktop computers, mobile computers, tablet computers (e.g., including e-book readers), mobile devices (e.g., a smartphone or PDA), or any other devices having appropriate processor, memory, and communications capabilities for generating random numbers on one of the servers 130. The network 150 can include, for example, any one or more of a local area network (LAN), a wide area network (WAN), the Internet, and the like. Further, the network 150 can include, but is not limited to, any one or more of the following network topologies, including a bus network, a star network, a ring network, a mesh network, a star-bus network, tree or hierarchical network, and the like.

Example System

Figure 2:
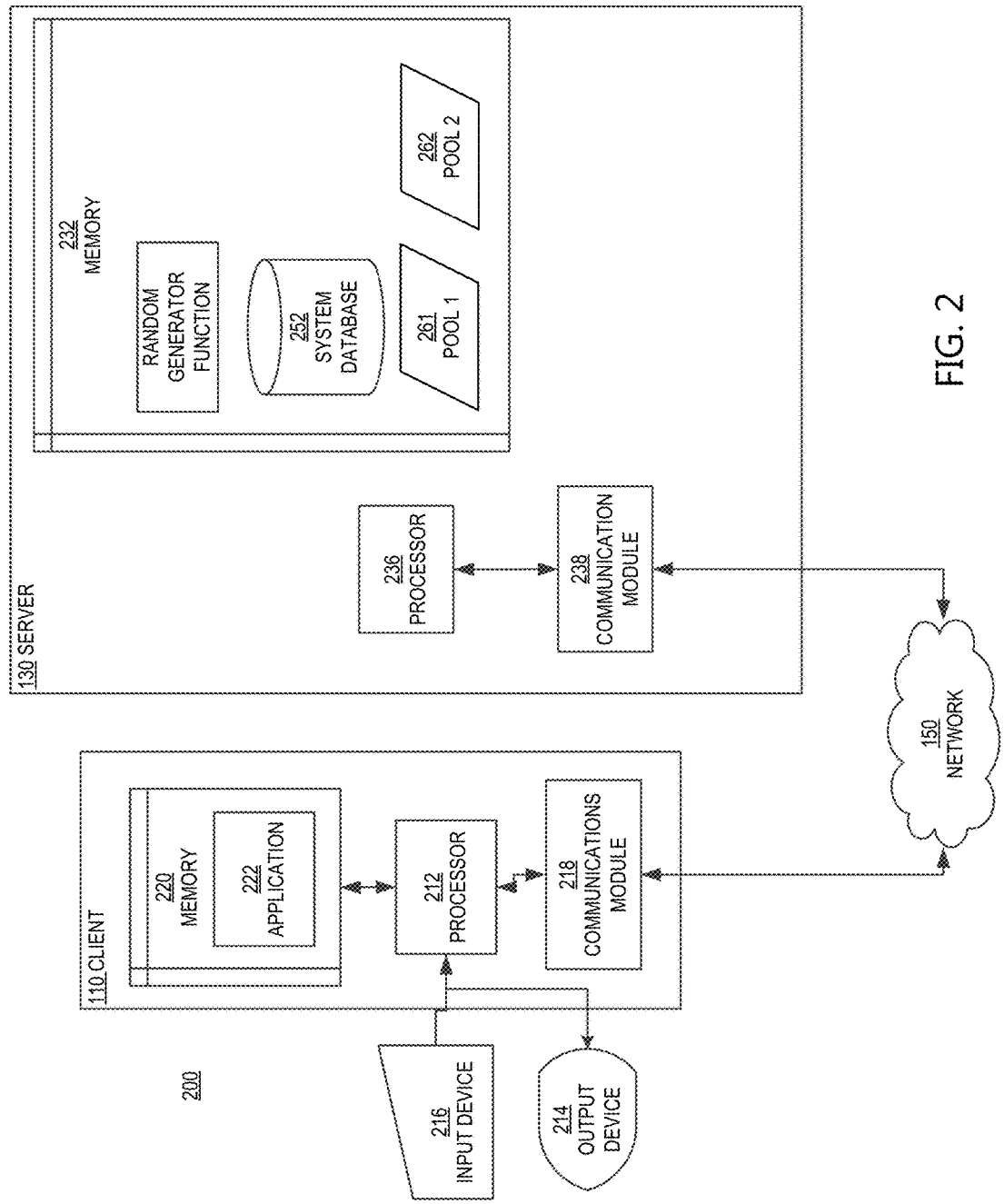
FIG. 2 is a block diagram illustrating an example client and server from the architecture of FIG. 1 according to certain aspects of the disclosure.

FIG. 2 is a block diagram 200 illustrating an example server 130 and client 110 in the architecture 100 of FIG. 1. The client 110 and the server 130 are connected over the network 150 via respective communications modules 218 and 238. The communications modules 218 and 238 are configured to interface with the network 150 to send and receive information, such as data, requests, responses, and commands to other devices on the network. The communications modules 218 and 238 can be, for example, modems or Ethernet cards.

The server 130 includes a memory 232, a processor 236, and a communications module 238. The memory 232 of the server 130 includes a system database 252, random generator function, and entropy pools 261-262.

The memory 232 includes the system database 252. The system database 252 represents a database that contains locally identifiable system information about the computer hardware, drivers, and software related data. The system database 252 may include historical data resident in the hard drive. Each component of the system information can be an entropy source for generating entropic data which will be stored in a respective entropy pool.

The memory 232 includes the entropy pools 261-262. Each entropy pool is assigned to a corresponding source of entropy (e.g., mouse, keyboard, file, process, network traffic, on-screen information, thread). In some embodiments, the entropic data stored in the entropy pool is allocated as a doubly linked list which allows walking and enumeration processes in both directions to traverse the pools. The memory 232 can include hundreds of pools on any given system based on the system data. Each pool is maintained separately from one another to prevent cross pollution of the pools. Each pool includes information about the user action associated with the source of entropy. Each pool also includes time information (e.g., timestamp) associated with each user action. Each pool can have megabytes of raw data collected from each source. The raw data in the pool can increase to a finite size.

Figure 3:
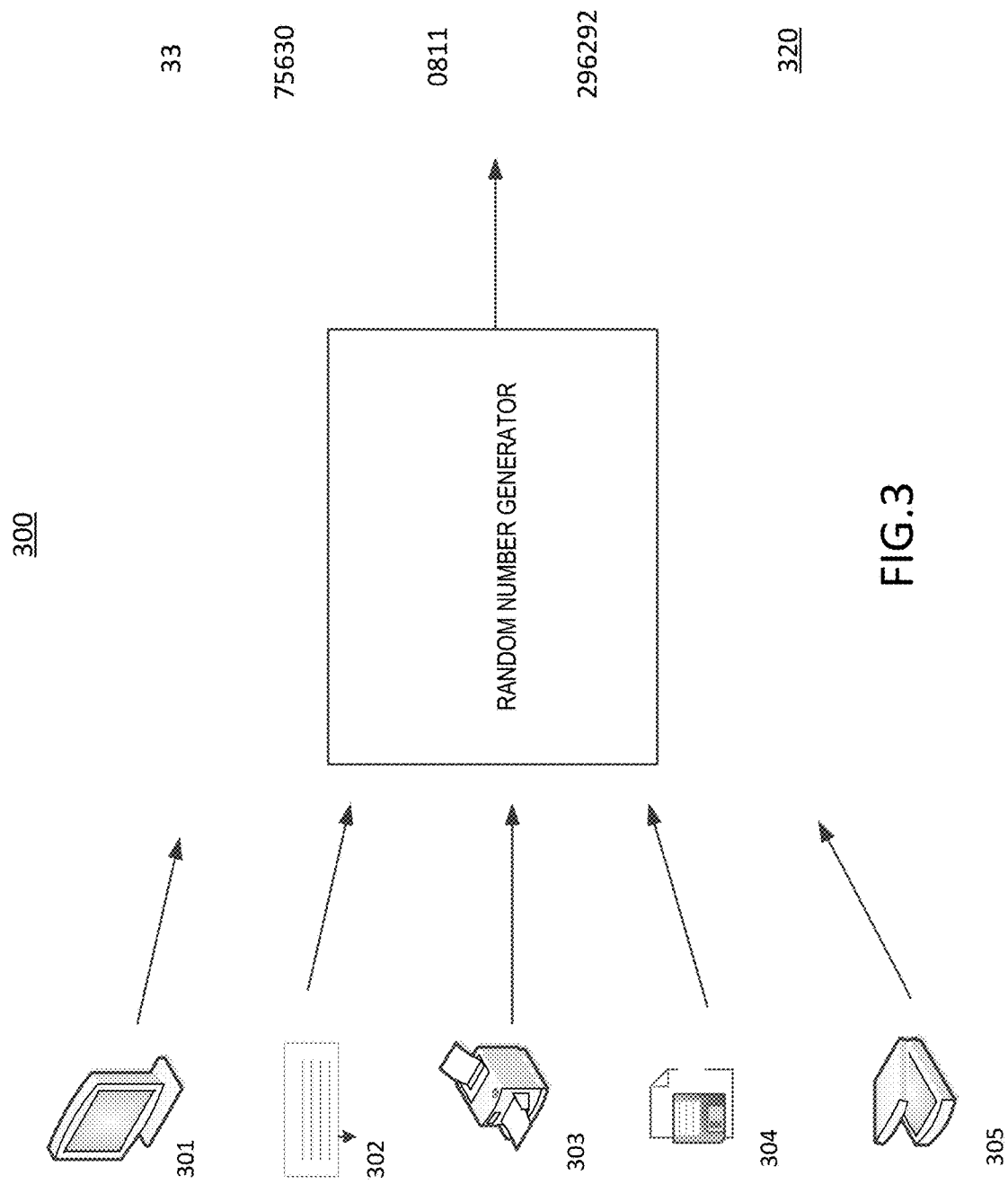
FIG. 3 illustrates an example block diagram for generating random numbers according to some implementations of the disclosure.

FIG. 3 illustrates an example block diagram 300 for generating random data. Upon installation of a program by a user, the program enumerates system information and locally-identifiable data about the system, building a base of unpredictable information which is dependent upon the state of the system and the historical data resident on the hard drive.

A cryptographic hash may be generated based on the unpredictable information. The hash is transmitted to the cloud service to check whether no other user has a matching hash. If the hash matches with another hash identified in the cloud, this indicates poisoning of the entropy sources where the hash is generated. The poisoned entropy source needs to be mitigated by incorporating data provided by the server into the generated random data.

Once the generated random data is stored, the product injects a code into active processes across the system. It enumerates processes and uses either a Kernel mode driver or usermode library to modify the entry points of each applicable function in each destination child process, placing trampoline hooks over the functions to ensure the product is invoked before the operating system call, giving the product control over the outcome and returned data.

A thread may be created to ensure that the replaced function pointers are not changed in the event of attacks from the malicious source. A series of threads starts to collect entropy from the system by observing events occurring on the computing device (e.g., files written, windows created, mouse movements, keystrokes, etc). The entropic data (e.g., seed data) regarding the state of the system may be collected by a wide array of devices or windows. The user may use any peripheral devices attached to the computing device and can create the entropic data. For example, the entropic data may be collected when the user watches a video on a monitor 301, types on a keyboard 302, prints from a printer 303, or uses a scanner 305. Alternatively, the entropic data may be collected when the user creates a file 304 (e.g., pdf file), transfers a file, or deletes a file 304. The entropic data may be collected when the user installs an application, downloads a software driver for the printer 303, opens up a new window, or performs certain tasks on the computing device. It stores these data as raw data, continually modifying and refreshing the data as more entropy flows in. In some embodiments, a hunting process may begin to collect any missing data. The hunting process can proactively query other parts of the system and gather additional data that was not collected initially.

As a child process executes any of the above functions, the interception function is performed. It first calls the original random number generator function, and then passes the result to the service process. The service process uses the original result as a data point alongside the rest of the entropy it gathered. It gathers an appropriate amount of entropy based on the application's request and returns the resultant random number 320 (e.g., 33, 75630, 0811) back to the client process which returns it back to the caller of the intercepted random number generator function.

Figure 4A:
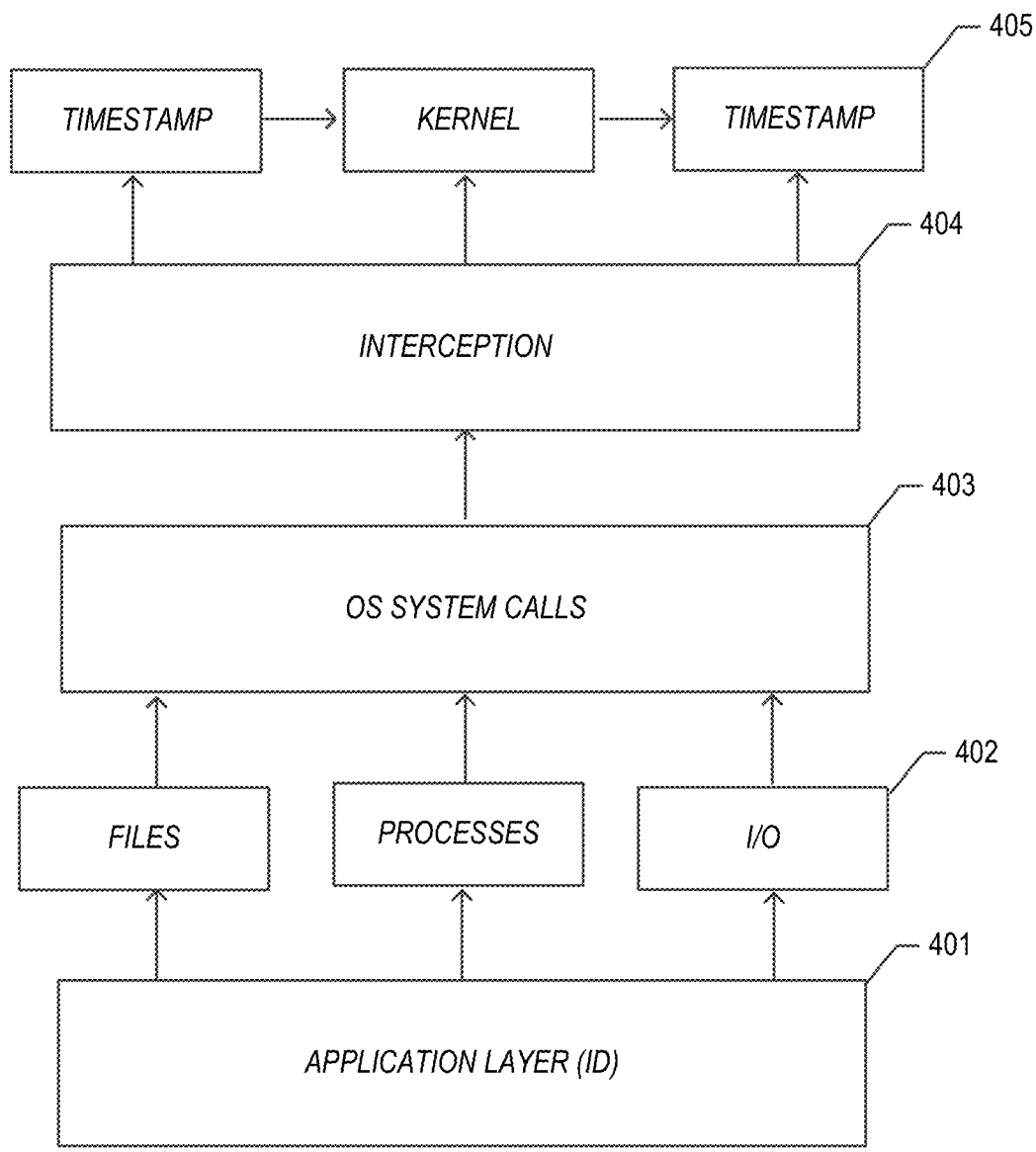
FIG. 4A illustrates an example block diagram for creating entropic information according to some implementations of the disclosure.

FIG. 4A illustrates an example block diagram 400 for creating entropic information. Entropy is gathered from a running system by intercepting system calls and inspecting data from each of the system calls. The system may obtain timestamps by calculating the system calls before and after each call takes place. The system may duplicate the entirety of the inspected data and timestamps into a contiguous block which is tagged with an identifier associated with the calling process, thread, and the device. The system stores each block intact, buffering new blocks until the total number of blocks is a prime number. This ensures that pollution sources can be identified, and entropy is gathered not only from the content of calls but also from the timing of each system call, which is fundamentally less predictable as it is dependent upon the overall state of the system.

In block 401, all the actions that are occurring in the operating system are observed at the application layer. At the application layer, actions performed by the user or any applications running in the background are monitored. In block 402, events occurring in any components of the computing device are monitored in real time and the data on the running system is proactively gathered to create pools for storing information associated with the events. For example, any movement associated with peripheral input/output devices such as a mouse movement, keyboard typing, or touchscreen tapping can be stored to create the entropy. Alternatively, any actions on the computing device such as transferring files, running processes, or downloading software can be stored to create the entropy. In this aspect, the system can determine what processes are running, what windows are open, what threads are starting, or what operations are occurring in the background.

Each computing device has its own uniqueness derived from different actions and events performed on the computing device. For example, when a user installs a software (e.g., a driver for a printer), a hardware (e.g., printer with a unique serial number) associated with the software may be different from another hardware (e.g., printer) with a different serial number. Accordingly, the entropy generated by installing the software can be different for each computing device. Some degree of uniqueness that exists intrinsically in the state of the system during the installation process of any application can generate the baseline entropy.

In block 403, the actions across the operating systems may funnel into performing Operating System (OS) system calls. The user mode applications may transit over into Kernel mode system calls. In block 404, to gain control of the encryption process, the system calls may be intercepted. For example, if an operating system performs a certain task, the system call is intercepted. A first timestamp is calculated, data is captured, and the original system call is invoked and returned, and a second timestamp is calculated. The interception process may be performed transparently to the operating system and any running applications. There may be a couple of ways to intercept the calls. API functions can be used to intercept the system calls. In some embodiments, setting hooks can be used to intercept the system calls. In another embodiment, installing device drivers can intercept the calls and gather the data in real time. A keyboard class driver, a mouse class driver, a file system mini filter driver, a network driver, and a variety of different device extensions that third-party application provides can be used to provide some facilities for instrumentation within the overall environment. This may allow gathering data from the system as it runs.

In block 405, each event occurring on the computing device is timestamped with the time information at the starting time of the event and at the ending time of the event. For example, if the user presses the space bar on the keyboard, the event is intercepted and the first timestamp (e.g., starting time) is gathered. Then, it is passed on to the operating system Kernel. If the user stops using the keyboard, another timestamp is gathered to measure the ending time of the event. When the operating system has finished processing, it receives a response indicating the event is now finished. Then the interception layer takes the data and passes it back into event storage. The duration of the event can be calculated based on the starting time (e.g., creating a file) and the ending time of the event (e.g., closing the file). In some embodiments, the duration of the event can be used to create the entropic data as it is more dependent upon the overall state of the system occurring in the background system.

The event information including the timestamp information is stored in a respective pool in the computing device. The gathered data from each of these sources are stored discretely in different packets in a pool that pertains to each individual source. Each pool is associated with a designated peripheral device or a type of event. For example, a first pool may be assigned solely for a mouse device, a second pool may be assigned solely for a printer device, a third pool may be assigned solely for files, and a fourth pool may be assigned for applications, as shown in block 402.

Having a separate pool for each source can prevent cross pollution. If one pool is manipulated with consistent and non-entropic data, the poisoned pool may be compromised to prevent cross pollution, leaving other pools intact and clean. Because each pool is sampled separately (the touchscreen taps would be held separately from the mouse movements), it can prevent any individual pool from affecting the overall set of pools that exists across the system.

Each of the pools may include megabytes of raw data. Raw data from each source continues to flow into a very large continuous buffer for each of those pools. As the buffer grows, all of the data is retained. The data can continue to grow to a finite size. When the data flows into the pool, the data can be appended to the pool. If the end of the pool is reached, data may begin to fill in from the beginning but existing pool data may not be overwritten. In this aspect, if the system has some performance limitations, all the available memory may not be exhausted. However, a fair amount of active memory appropriate for the given system is stored to ensure that the entropy is stored as much as possible.

Once the entire pool is filled up, it loops back and starts storing the data over at the beginning of the buffer again and encrypts the previous data with the new data. In some embodiments, the buffer may work as a rolling buffer within the pool, resulting in no data loss, overwriting data, or losing entropy. The existing entropic data is retained and data is limited by the finite number of permutation within the overall pool.

Figure 4B:
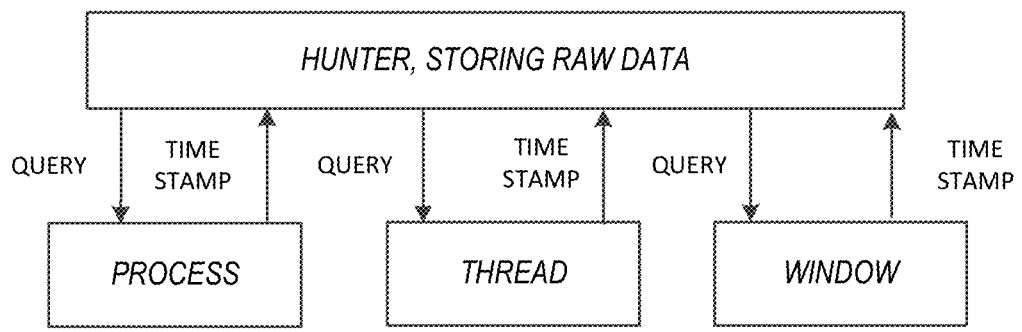
FIG. 4B illustrates an example block diagram for collecting missing data according to certain aspects of the disclosure.

FIG. 4B illustrates an example block diagram 410 for collecting the missing data. The hunter can proactively query other parts of the system and gather more data that was not collected initially. For example, if the system is sitting idle and nothing is happening (e.g., the user is not moving the mouse, not touching the keyboard, no files are changing), the hunter can check the status of the system in different areas. The hunter can gather additional entropy that was missed and the missing data is timestamped using the above described method and stored into the consolidated storage.

Figure 4C:
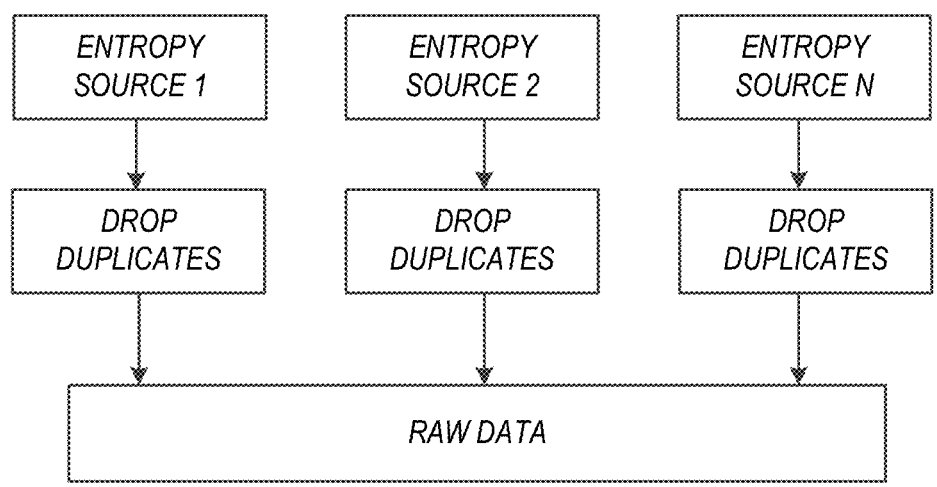
FIG. 4C illustrates an example block diagram for checking duplicates in the raw data according to certain aspects of the disclosure.

FIG. 4C illustrates an example block diagram 420 for checking duplicates in the raw data. Each pool will individually check for duplicates as the raw data flows in. If there is a duplicate, the duplicate will be ignored. Non-duplicated data from each pool is consolidated and stored in the storage as raw data.

Figure 4D:
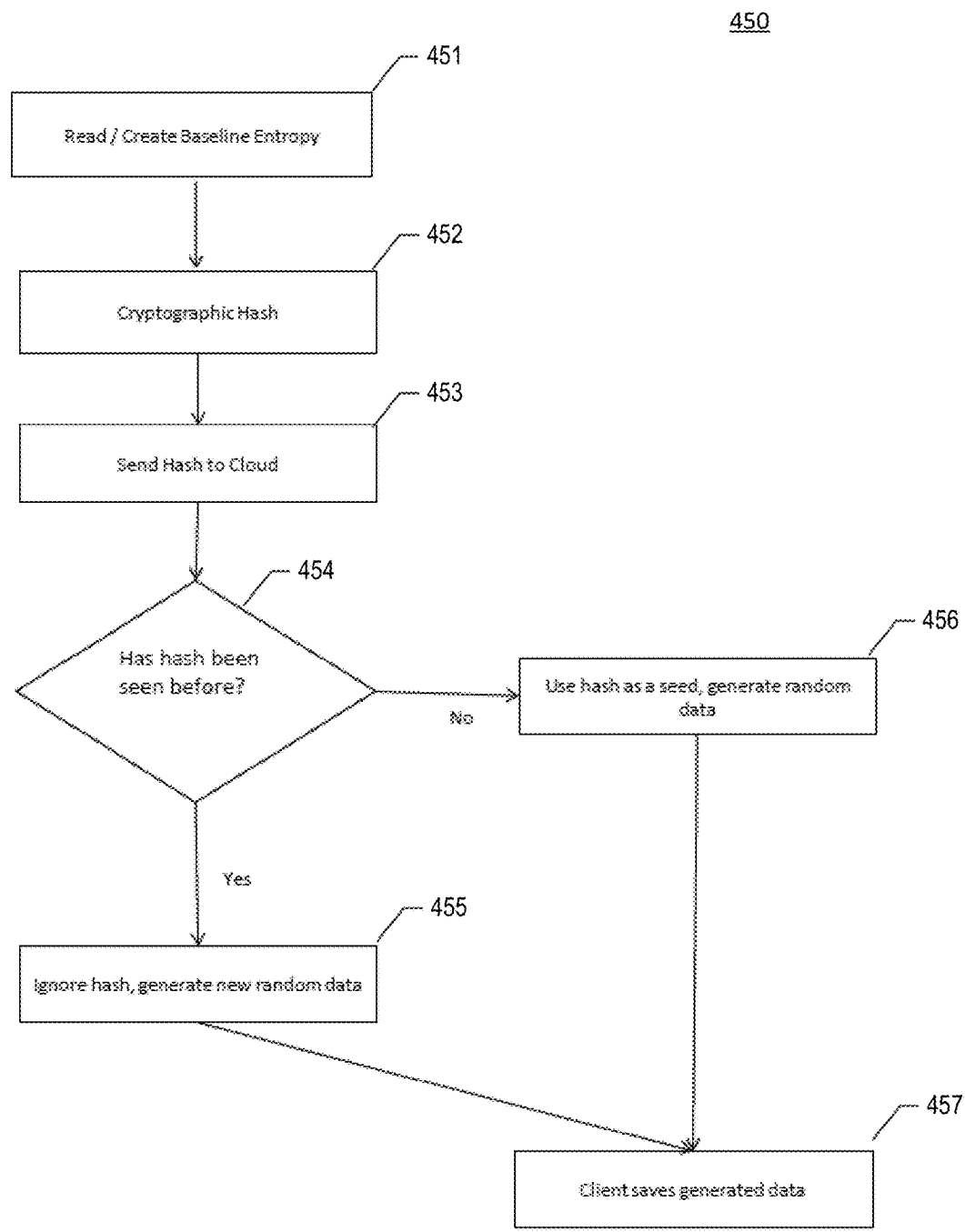
FIG. 4D illustrates an example matching process according to certain aspects of the disclosure.

FIG. 4D illustrates an example matching process 450. In block 451, the baseline entropy encompassing the uniqueness of the system is generated. In block 452, the cryptographic hash is generated. In block 453, the hash of the data is sent to the cloud to double check that entropy is uniquely tied to the system. In the event that the system is replicated or some malicious actors injecting uninvited data into that system to bias the random generated data, the system can de-duplicate (reverse the replicating process) that via the cloud by having an impartial check of what that hash matches. In block 454, the hash is checked to determine if that hash has been seen before. The data in the cloud may be compared with the cryptographic hash to determine whether an identical hash exists in the cloud. In block 455, if the hash has been seen before, the hash is ignored and new random data is generated. The new random data may be resupplied locally to ensure that the system is running based on an accurate and unique data. In block 456, if the hash has not been seen before, the hash is used as a seed to generate the random data. In block 457, the generated random data is stored in the memory.

Figure 5:
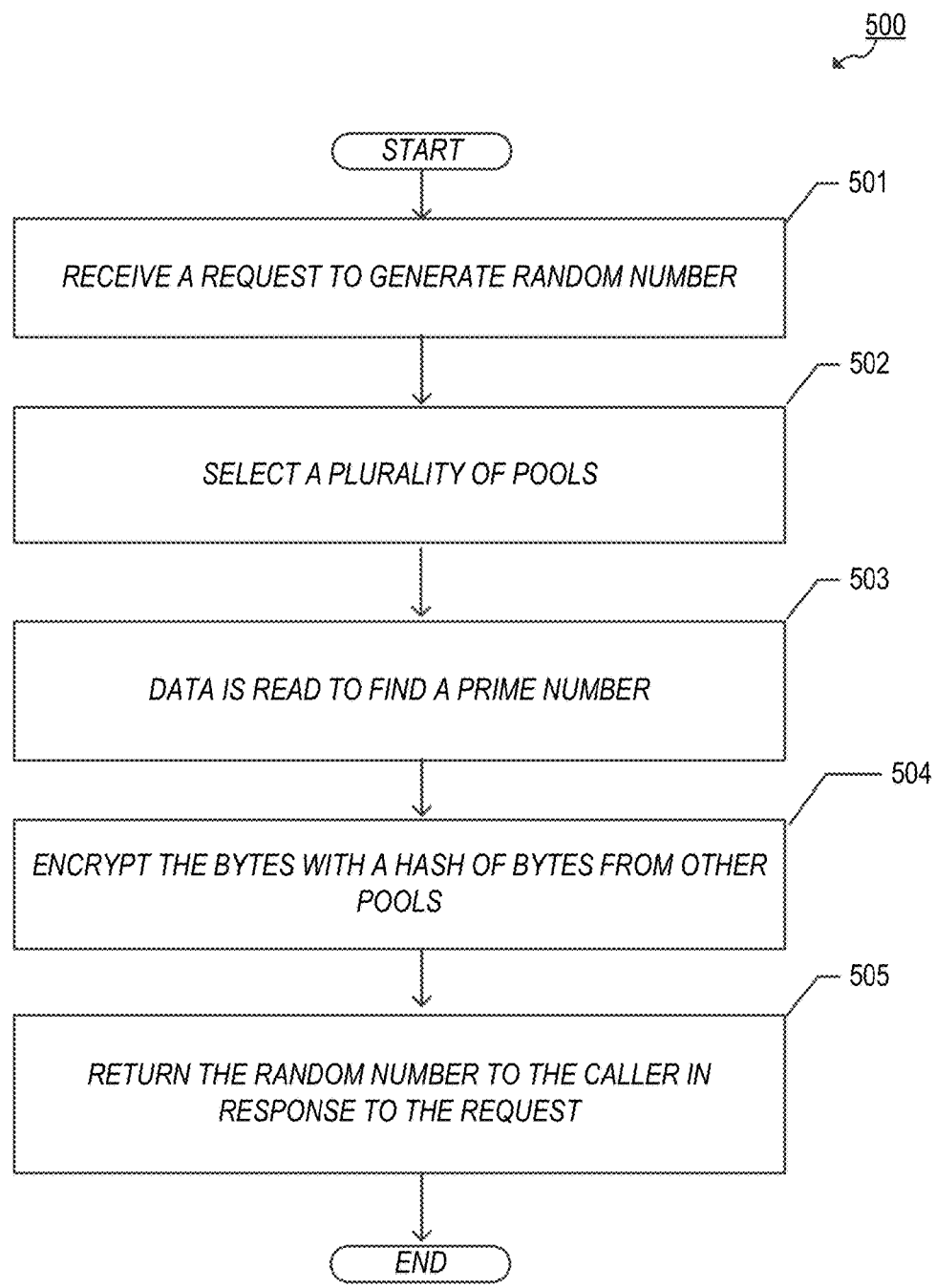
FIG. 5 illustrates an example process for generating a random number according to certain aspects of the disclosure.

FIG. 5 illustrates an example process 500 for generating random numbers. Although the operations in process 500 are shown in a particular order, certain operations may be performed in different orders or at the same time.

At step 501, a request is received to generate a random number. For example, a user using a banking application to connect to banking websites may request a passcode, often times consisted of random numbers, to securely log-in to the banking websites. When the user requests a passcode, a request may be generated to create the random number to be supplied to the user. In some embodiments, the request can be generated from any arbitrary process in the system and sent to the service process. The service process may respond with a buffer of random data.

At step 502, an entropy pool is selected to provide data for the stream cipher. A random pool is selected with a check to ensure the previously chosen random pool is not selected again for this request or the next request. Further, a random pool may be selected with a check to ensure that the data is not selected from a single pool or nearby pools. More than one pool may be selected to read the requested bytes from the system. Thus, a selection mechanism may be implemented to make sure that data is gathered from each pool to ensure that the selected pool is free from pollution.

At step 503, bytes are read from the selected pool at the selected pool's current read pointer. This entails taking the input number of requested bytes (i.e., 1000), finding the square root of the number of bytes requested (i.e., ~31.6), then finding the nearest prime number (i.e., 37). For example, the requested bytes are the number of bytes requested by the calling application. If a web browser needs 1000 random bytes to encrypt ongoing communication data, it will request 1000 bytes from the random number generator functions which would, in turn, result in handling of the 1000 requested bytes. The benefit of generating the prime number to the square root of a number of requested bytes is that it does not walk over on an even interval once it passes across the entire pool. The read pointer will not perfectly land on where it started because it is a prime number integral, ensuring that the read pointer will always start from a different position.

Once the identified number of bytes is read from the first pool, the process is repeated for the other pools until at least the number of requested bytes has been read. For example, the first pool may be selected (e.g., pool 11). From pool 11, the 37 bytes are read and the read pointer is moved forward 37 bytes. When the next random number generation request is given to the random number generator, the requestor is configured to select pool 11 to read from and begin reading from this new position. This prevents the returned bytes from being identical at the end of every cycle or iteration. For example, if pool 11 were 100 bytes long and 10 bytes were requested continuously, the returned bytes would be identical every 10 iterations. However, reading the nearest prime number to the square root of the number of requested bytes can prevent the returned bytes to be different for every iteration or cycle.

In some embodiments, selecting data from multiple pools may be required. In this aspect, a fraction of the data from the mouse pool may be selected and another fraction of the data may be selected from the keyboard pool. Each of those data may be incorporated together to generate the random number. For example, the random number generator may read 37 bytes from pool 11, 20 bytes from pool 46 and 15 bytes from pool 39. The aggregated subsections of bytes from each of these pools are what are returned from this part of the random number generator. Accordingly, it may be challenging for a malicious actor to predict the source pool for the seed data, as the pool is constantly changing (i.e., creating a different generation) and different pools may be used for selecting the seed data.

In some embodiments, a defense mechanism may be put into place to prevent pollution of the pools. If malicious actors were to put a bunch of zeros in the pool which would erase the entropy, the defense mechanism may be activated to compress those zeros down. The defense mechanism can be activated upon detecting an initial pollution of the pools. In some embodiments, the defense mechanism can be activated to prevent future pollution of the pools to secure the pools.

At step 504, the original bytes from each pool are encrypted with a hash of all of the bytes read from other pools. As those bytes are read, they are encrypted with all of the other bytes that have been read from each of the pools (e.g., all the pools contribute to the overall entropy) by incrementing the counter. For example, if ten bytes are read, the pool counter is moved past the previous read and the read counter starts from the eleventh byte. This ensures that no same data is used for subsequent or even near term requests.

In certain aspects, different subsections of bytes can be aggregated from multiple different pools. To prevent and further limit any pollution within the pools, the random number generator calculates a hash of all of the read bytes (the bytes from pools 11, 46, and 39) and encrypts the original data in each of the respective pools with the hash from the aggregate read bytes from all of the pools. Thus, 37 bytes from pool 11 will be replaced with the output of the encryption function called with the original bytes as input and the hash of the bytes from pools 11, 46, and 39 as the key. This allows each of the pools to retain their separate entropy but to limit and reduce the negative impact of any individual pool's poisoning by incorporating the non-poisoned entropy from other pools.

The existing data stored in the pool is replaced with that hash of other pool data. Thus, if one pool happens to be compromised, it will slowly become less compromised, because the entropy from the other pools would come in and modify the existing stored data with the encrypted hash of that data, as they are read on each subsequent request. The pools can help each other over time to counter the ability to pollute a single pool approach.

The pool data may be encrypted with the stream cipher using the above derived random key. The encryption is not reversible, but rather, is used to return strongly entropic data due to the nature of stream ciphers preventing information about the original data from being gleaned from the output. This prevents the same data from being sampled from any given pool and ensures that a wide range of pools are chosen to build the data to be sent to the stream cipher.

In some embodiments, the counter may be a buffer which can be treated as an integer. In other words, the counter may be a buffer that is used for one extremely large integer that is incremented each time when a new random number is requested. It may be 4096 or more bytes in length which offers a period of $2^{32768}$ before repeating the cycle. The 4096 bytes (32768 bits) can be stored in shared memory across all random number generator instances. The excessive size of the buffer can vastly increase entropy and security. The size of the counter may vary based on the implementation details.

The counter is configured to work as an encryption seed or an encryption key over the gathered random data. The read data is encrypted using the counter or over the gathered seed data. The nature of the randomness of the encryption algorithm can generate highly entropic data. In certain aspects, the constantly incrementing counter gives a very large buffer (e.g., 4,096 bytes) of always changing data to ensure that the data is substantially modified each time it increments. By ensuring that the repetition period is excessively long (i.e., due to the size of the counter), it prevents any observation of sequential generated random numbers before the cycle repeats. Due to the low frequency of cycle, it becomes very challenging to observe a series of successively generated random numbers. Accordingly, prediction of future random numbers derived from the repetition cycle becomes very unlikely.

In some embodiments, the counter moving forward even by one bit can result in vastly different and normally distributed data. For example, assuming that the entropic pool was just a series of a hundred zeros and if the counter increases by one, the encrypted zeros will look completely different than when the counter position was one lower. Accordingly, it gives another level of obfuscation for the output random number, lowering predictability.

In some embodiments, a position inside the counter is stored. This modifies arbitrary points within the counter, carrying over any overflow to change the higher bits. For example, if the counter was at [9][5][6][7][2] and the position was 3, then the third number would be incremented, resulting in [9][5][7][2]. This prevents the counter from being incremented in a predictable manner.

The bytes can be changed continually by background threads, independent of requests. This ensures that observing successive requests cannot allow the output to be rolled backward or forward. The significantly increased size of the counter allows these bytes to be changed regularly. The bytes are also changed when random numbers are generated, further incrementing and moving through the buffer. The buffer is configured to change even if the background thread does not come around to modify the buffer between requests.

In some embodiments, each time a random value is requested, the buffer is incremented, performing the appropriate carry instructions to increment the full block of data as if it was a very large single integer. This is then used as a large key to a stream cipher. The carry functions can vary based on the implementation for the counter. The counter may need to be iterated over to increment as the data overflows from each integer.

In some implementations, the bytes may be initialized on startup with the persistent system entropy. In this aspect, the integer does not start at zero. The integer is first initialized with the results from the cryptographic hash that is generated for the system and the data gathered in real time. This enables a global incrementing counter (continually incrementing in the background). The large volume of base can decouple the request from the results, in that the numbers can continue to increase, both with or without the random number requests. By leveraging the stored entropy, the counter can add a significant amount of variability to the generated data.

In some embodiments, a lock mechanism may be implemented to increment the value in the counter. For example, the lowest bit of the 4,096 bytes is incremented and the increased value is carried over to all the rest of the bits using a critical section or an interlocked function. When the lock on the memory is implemented, the value is incremented and the lock is returned. In some embodiments, the counter can be accessed via atomic operations which lock any reads/writes on the counter while it is being modified.

At step 505, the encrypted bytes are then returned to the caller as random numbers 320 in response to the requests to generate the random number.

Figure 6B:
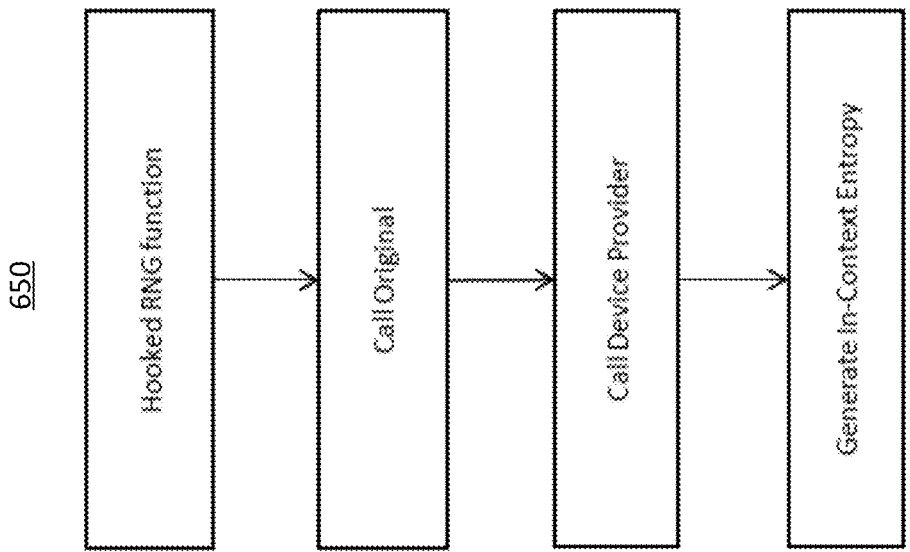
FIG. 6B illustrates an example block diagram for generating further entropy according to certain aspects of the disclosure.
Figure 6A:
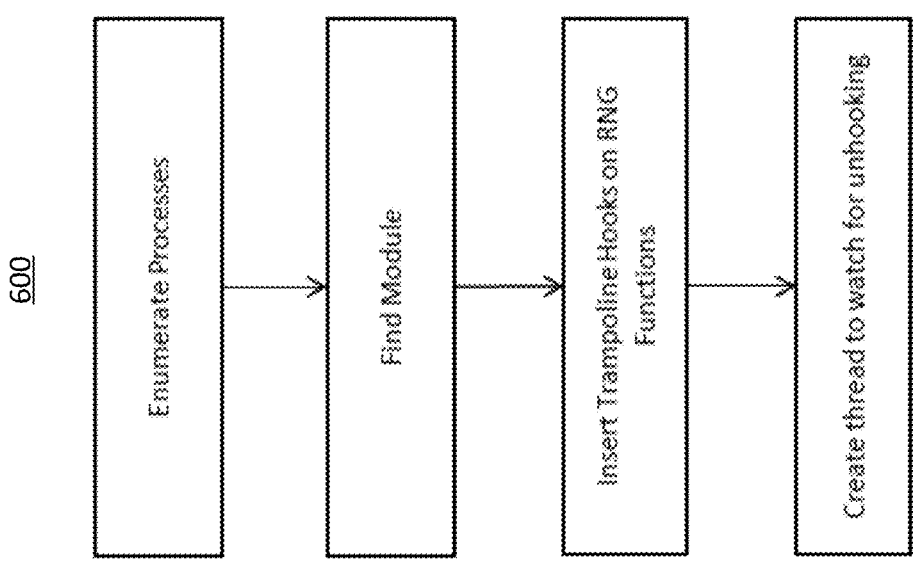
FIG. 6A illustrates an example process for inserting a hook on the random number generator function number according to certain aspects of the disclosure.

FIG. 6A illustrates an example block diagram 600 for inserting a hook on the random number generator function. The process starts at the enumeration process where all processes are enumerated to find modules loaded into each process. A trampoline hook may be inserted on the random number generator (RNG) function to prevent the malicious actor from replacing the current hook with an original hook or a new hook. A thread may be created within each of those processes to monitor any attempts to unhook the trampoline hook from the RNG function from the malicious actors.

In some embodiments, hooking functionality may be used to replace existing random number generators. The RNG resident in third-party processes can be replaced without rewriting the applications. Existing random number generators need to be linked to third-party applications and modified whenever the applications are updated. In this sense, the random number generator can be decoupled from the third-party application. The RNG can also be decoupled from the operating system's internal functions which give it a unique position to operate in an agnostic manner. The replacing functionality can provide transparency to the RNG and accurate data without the third-party application vendors needing to replace or change their old interface.

FIG. 6B illustrates an example block diagram 650 for generating further entropy. When the application calls the random number generator function, the present random number generator is invoked first and calls the original random number generator function. The result from the original random number generator function is received and further in-context entropy is generated based on the result received from the original random number generator.

Figure 7A:
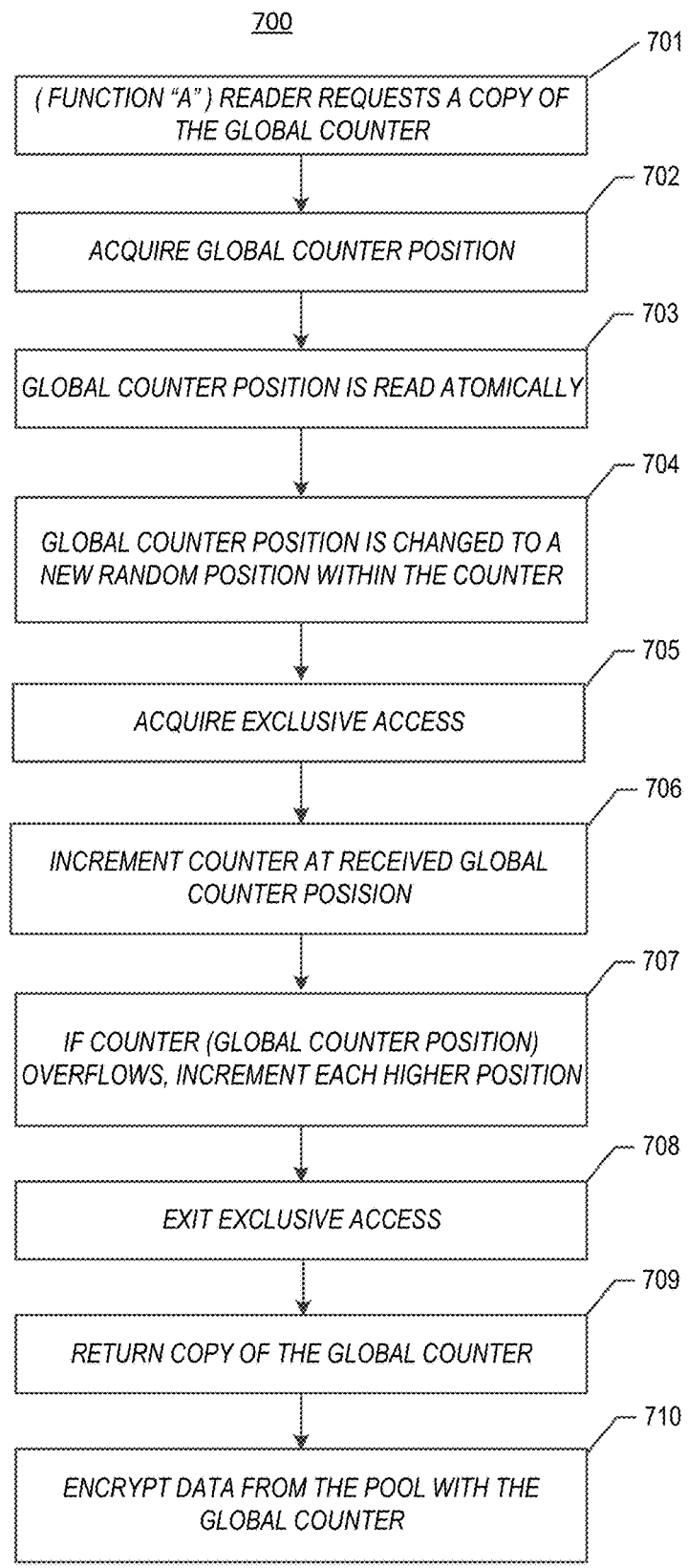
FIG. 7A illustrates an example process for encrypting data on a client side.

FIG. 7A illustrates an example process 700 for encrypting data on the client side. At step 701, a reader (e.g., client device) of the counter requests a copy of the global counter (e.g., Function A). At step 702, the reader acquires a current position of the global counter. At step 703, the global counter position is read. At step 704, the position of the global counter is configured to change to a new position based on the read data (e.g., pool counter is moved a prime number of bytes away from its starting position). At step 705, exclusive access is acquired. At step 706, the counter is incremented by the prime number of bytes. At step 707, the counter is incremented to a higher position if the counter overflows. At step 708, exclusive access is exited. At step 709, the copy of the global counter is returned. At step 710, data from the pool is encrypted with the global counter.

Figure 7B:
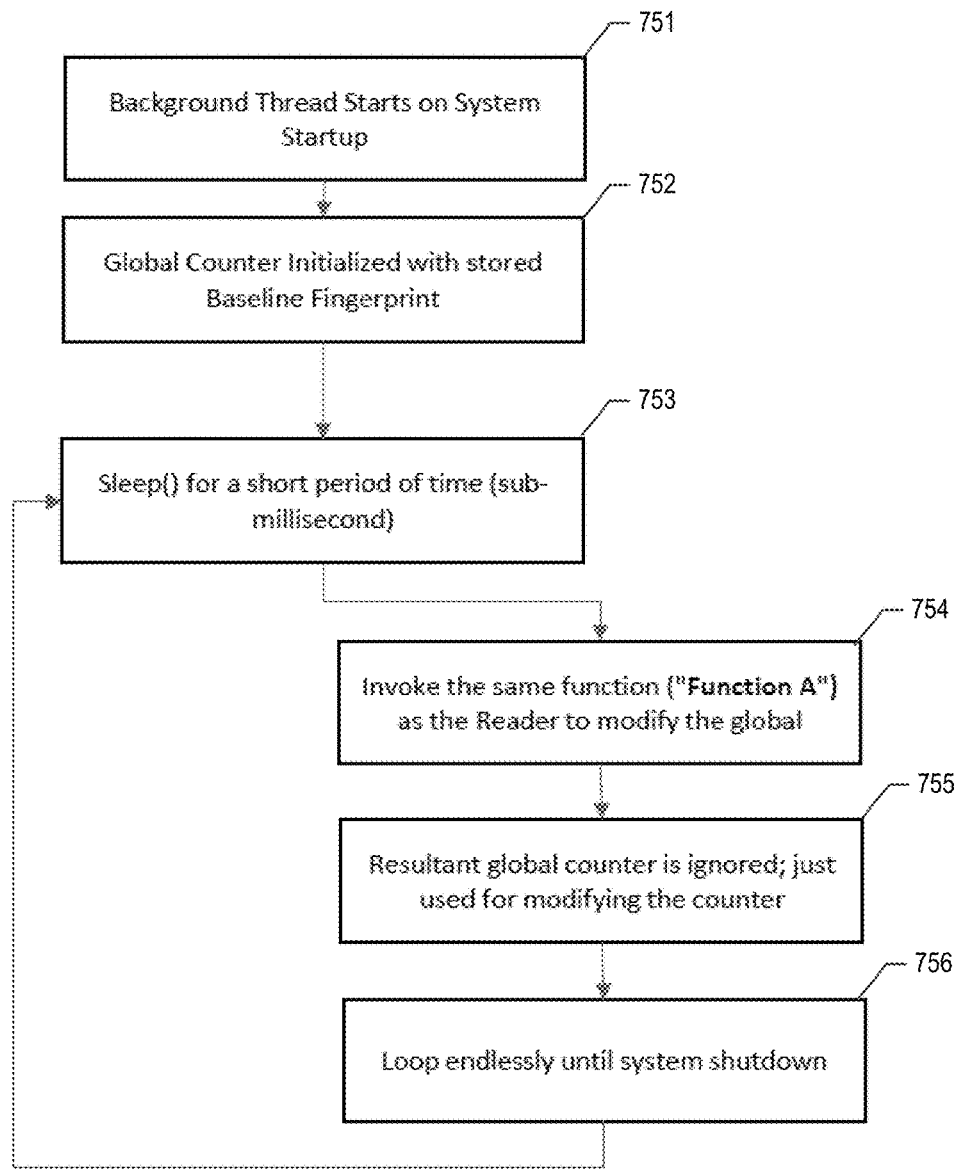
FIG. 7B illustrates an example process for encrypting data on a server side.

FIG. 7B illustrates an example process 750 for encrypting data on the server side. In some embodiments, the process can be performed on the server side independently of the client device, which minimizes the system resources by having an ability to call out a service process when needed. The codes may not have to be resident in each process to perform the encryption tasks. The process starts at step 751 where the background thread is configured to start on the system startup. The thread can be per-process-thread to handle a high volume of requests for a large number of processes simultaneously. By creating one thread per each request, the random data can be supplied with no locking function. In some embodiments, entropic data gathered by the thread can be stored in a service process in-memory, not in a database. At step 752, the global counter is initiated with the stored baseline fingerprint. At step 753, the process is configured to sleep for a sub-millisecond. The time range may vary depending on the implementation details. At step 754, as the reader at the client device modifies the global counter, the same function (e.g., Function A) is invoked. At step 755, resultant global counter is ignored. At step 756, the process loops back to step 753 until the system shuts down.

In some embodiments, a web server may be used to identify unique data in connection with FIG. 4D. Any type of web server may be used. The web server may receive a GET request with the cryptographic hash of the random data. The web server may be hosted on-premise. The web server is configured to check the database to determine if the same hash has been seen before. If the hash matches, the web server will return new entropic data via a response body. The new entropic data can be generated on the web server using the same algorithm as on the local device.

A web server may be contacted with a checksum of the data read from the files. The checksum is compared to all previously received checksums to identify if the data stored on the system is unique across the user base. If the data is not unique, the checksum is replaced with a newly generated checksum of random data from within the web server and the calling application is responded to with a block of random data generated from the checksum.

Hardware Overview

Figure 8:
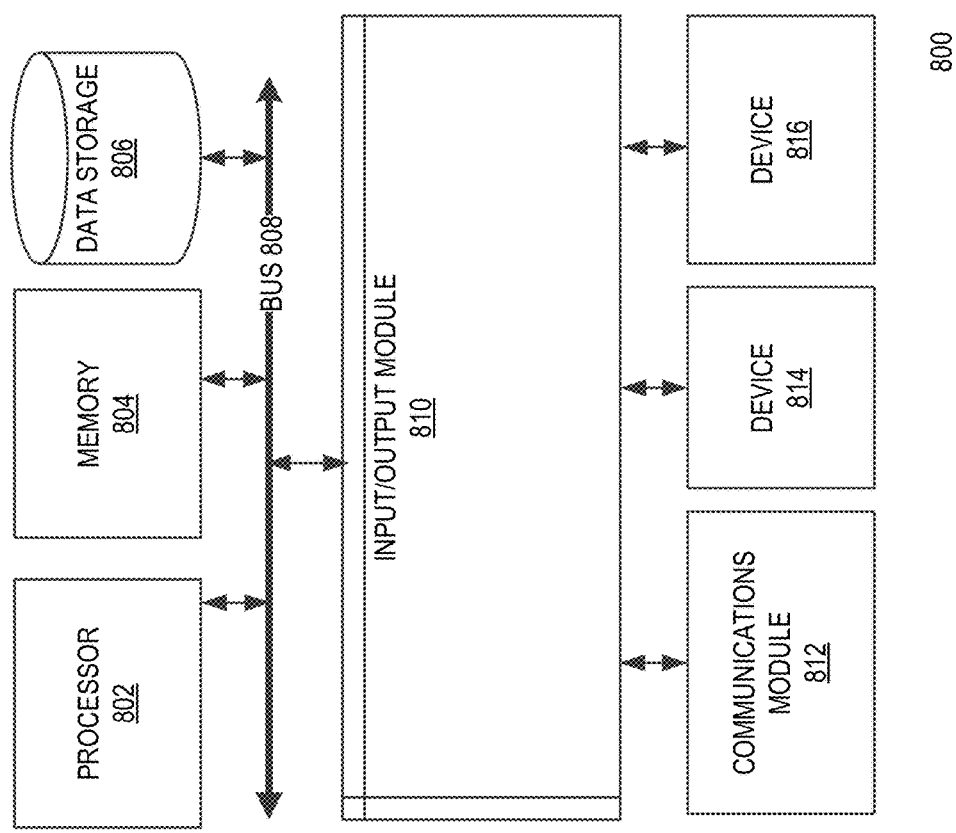
FIG. 8 is a block diagram illustrating an example computer system with which the client and server of FIG. 2 can be implemented.

FIG. 8 is a block diagram illustrating an exemplary computer system 800 with which the client 110 and server 130 of FIG. 1 can be implemented. In certain aspects, the computer system 800 may be implemented using hardware or a combination of software and hardware, either in a dedicated server, or integrated into another entity, or distributed across multiple entities.

Computer system 800 (e.g., client 110 and server 130) includes a bus 808 or other communication mechanism for communicating information, and a processor 802 (e.g., processor 212 and 236) coupled with bus 808 for processing information. By way of example, the computer system 800 may be implemented with one or more processors 802. Processor 802 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 800 can include, in addition to hardware, a code that creates an execution environment for the computer program in question, e.g., code that constitutes processor firmware, a protocol stack, a database management system, an operating system, or a combination of one or more of them stored in an included memory 804 (e.g., memory 220 and 232), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 808 for storing information and instructions to be executed by processor 802. The processor 802 and the memory 804 can be supplemented by, or incorporated in, special purpose logic circuitry.

The instructions may be stored in the memory 804 and implemented in one or more computer program products, i.e., one or more modules of computer program instructions encoded on a computer readable medium for execution by, or to control the operation of, the computer system 800, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, and xml-based languages. Memory 804 may also be used for storing temporary, variable or other intermediate information during execution of instructions to be executed by processor 802.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 800 further includes a data storage device 806 such as a magnetic disk or optical disk, coupled to bus 808 for storing information and instructions. Computer system 800 may be coupled via input/output module 810 to various devices. The input/output module 810 can be any input/output module. Exemplary input/output modules 810 include data ports such as USB ports. The input/output module 810 is configured to connect to a communications module 812. Exemplary communications modules 812 (e.g., communications modules 218 and 238) include networking interface cards, such as Ethernet cards and modems. In certain aspects, the input/output module 810 is configured to connect to a plurality of devices, such as an input device 814 (e.g., input device 216) and/or an output device 816 (e.g., output device 214). Exemplary input devices 814 include a keyboard and a pointing device, e.g., a mouse or a trackball, by which a user can provide input to the computer system 800. Other kinds of input devices 814 can be used to provide for interaction with a user as well, such as a tactile input device, visual input device, audio input device, or brain-computer interface device. For example, feedback provided to the user can be any form of sensory feedback e.g., visual feedback, auditory feedback, or tactile feedback; and input from the user can be received in any form, including acoustic, speech, tactile, or brain wave input. Exemplary output devices 816 include display devices, such as a LCD (liquid crystal display) monitor, for displaying information to the user.

According to one aspect of the present disclosure, the client 110 and server 130 can be implemented using a computer system 800 in response to processor 802 executing one or more sequences of one or more instructions contained in memory 804. Such instructions may be read into memory 804 from another machine-readable medium, such as data storage device 806. Execution of the sequences of instructions contained in main memory 804 causes processor 802 to perform the process steps described herein. One or more processors in a multi-processing arrangement may also be employed to execute the sequences of instructions contained in memory 804. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back-end component e.g., as a data server, or that includes a middleware component e.g., an application server, or that includes a front end component e.g., a client computer having a graphical user interface or a Web browser through which a user can interact with an implementation of the subject matter described in this specification, or any combination of one or more such back-end, middleware, or front end components. The components of the system can be interconnected by any form or medium of digital data communication e.g., a communication network. The communication network (e.g., network 150) can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 800 can include clients and servers. A client and server are generally remote from each other and typically interact through a communication network. The relationship of client and server arises by virtue of computer programs running on the respective computers and having a client-server relationship with each other. Computer system 800 can be, for example, and without limitation, a desktop computer, laptop computer, or tablet computer. Computer system 800 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer readable medium" as used herein refers to any medium or media that participates in providing instructions to processor for execution. Such a medium may take many forms, including, but not limited to, non-volatile media, volatile media, and transmission media. Non-volatile media includes, for example, optical or magnetic disks, such as data storage device. Volatile media includes dynamic memory. Transmission media include coaxial cables, copper wire, and fiber optics, including the wires that comprise bus. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method, comprising:
    receiving a first request for generating a random number;
    collecting entropic data generated from an entropy source of a plurality of entropy sources in a client computing device;
    storing the collected entopic data in a first pool, wherein each entropy source is assigned to a corresponding pool, the stored entropic data is raw data;
    encrypting, using a counter, the entropic data from the first pool with a hash of entropic data from a second pool wherein the second pool is randomly selected;
    providing the encrypted data to the client computing device, wherein the encrypted data is a random number;
    comparing the encrypted data with a history of past encrypted data stored in a data cloud;
    determining that the encrypted data is identical to one of the past encrypted data;
    based on the determination, generating a new random number; and
    providing the generated random number to the client computing device.

2. The computer-implemented method of claim 1, wherein the entropic data is generated based on a user action associated with the entropy source.

3. The computer-implemented method of claim 2, further comprising:
    providing a timestamp at a starting time of the user action and an ending time of the user action associated with the entropy source; and
    storing information regarding the timestamp in the first pool.

4. The computer-implemented method of claim 1, further comprising:
    sending a query for collecting additional entropic data to the corresponding entropy source of the client computing device; and
    in response to the query, collecting the additional entropic data, wherein the additional entropic data is different from the entropic data.

5. The computer-implemented method of claim 1, further comprising:
    selecting the first pool from a plurality of pools for the first request, wherein the selected first pool for the first request is different from a pool for a second request.

6. The computer-implemented method of claim 1, further comprising:
    matching the entropic data with existing data stored in the first pool;
    determining that the entropic data matches with the existing data stored in the first pool; and
    removing the matched entropic data from the first pool.

7. The computer-implemented method of claim 1, further comprising:
    determining that the encrypted data has been replicated by a third party application using a replicating process; and
    de-duplicating the replicated encrypted data by performing a reverse replicating process.

8. The computer-implemented method of claim 1, further comprising:
    determining a current position of a read pointer of the counter for the first pool;
    determining a prime number nearest to a square root of a number of requested bytes;

encrypting bytes at the current position of the read pointer with the hash of bytes from the second pool; and incrementing the current position of the read pointer of the counter by a prime number of bytes.

9. The computer-implemented method of claim 1, further comprising:

inserting a trampoline hook on a random number generator function; and creating a thread to monitor unhooking of the random number generator function.

10. A system comprising:

one or more processors;

a computer-readable storage medium coupled to the one or more processors, the computer-readable storage medium including instructions that, when executed by the one or more processors, cause the one or more processors to perform a random number generator function comprising:

receive a first request for generating a random number;

collect entropic data generated from an entropy source of a plurality of entropy sources in the client computing device;

store the collected entopic data in a first pool, wherein each entropy source is assigned to a corresponding pool, the stored entropic data is raw data;

incorporate the entropic data from at least one second pool into the first pool;

encrypt, using a counter, the entropic data from the first pool with a hash of entropic data from the at least one second pool;

provide the encrypted data to the client computing device, wherein the encrypted data is the random number;

inserting a trampoline hook on the random number generator function; and creating a thread to monitor unhooking of the random number generator function.

11. The system of claim 10, wherein the entropic data is generated based on a user action associated with the entropy source.

12. The system of claim 11, wherein the instructions further cause the one or more processors to:

provide a timestamp at a starting time of the user action and an ending time of the user action associated with the entropy source; and store information regarding the timestamp at the first pool.

13. The system of claim 10, wherein the instructions further cause the one or more processors to:

send a query for collecting additional entropic data to the corresponding entropy source of the client computing device; and in response to the query, collect the additional entropic data, wherein the additional entropic data is different from the entropic data.

14. The system of claim 10, wherein the instructions further cause the one or more processors to:

select the first pool from a plurality of pools for the first request, wherein the selected first pool for the first request is different from a pool for a second request.

15. A non-transitory machine-readable medium comprising instructions stored therein, which when executed by a machine, cause the machine to perform operations comprising:

receiving a first request for generating a random number;

collecting entropic data generated from a plurality of entropy sources in the client computing device;

storing the collected entopic data in a plurality of pools, wherein each pool is assigned to a corresponding entropy source, the stored entropic data is raw data;

encrypting, using a counter, the entropic data from a first pool of the plurality of pools with a hash of entropic data from a second pool of the plurality of pools;

providing the encrypted data to the client computing device, wherein the encrypted data is a random number;

determining a current position of a read pointer of the counter for the first pool;

determining a prime number nearest to a square root of a number of requested bytes;

encrypting bytes at the current position of the read pointer with a hash of bytes from the second pool; and incrementing the current position of the read pointer of the counter by a prime number of bytes.

16. The non-transitory machine-readable medium of claim 15, the operations further comprising:

matching the entropic data with existing data stored in the first pool;

determining that the entropic data matches with the existing data stored in the first pool; and removing the matched entropic data from the first pool.

17. The non-transitory machine-readable medium of claim 15, the operations further comprising:

comparing the hash with the history of past hashes stored in the data cloud;

determining that the hash is identical to one of the past hashes;

based on the determination, generating a new random data; and providing the generated new random data to the client computing device.

18. The non-transitory machine-readable medium of claim 15, the operations further comprising:

inserting a trampoline hook on a random number generator function; and creating a thread to monitor unhooking of the random number generator function.

* * * * *